US009899708B2

(12) United States Patent
Kim et al.

(10) Patent No.: US 9,899,708 B2
(45) Date of Patent: Feb. 20, 2018

(54) ELECTRODE ASSEMBLY WITH POROUS STRUCTURE AND SECONDARY BATTERY INCLUDING THE SAME

(71) Applicant: LG Chem, Ltd., Seoul (KR)

(72) Inventors: Soo Young Kim, Daejeon (KR); Young Joon Shin, Daejeon (KR); Hyo Seok Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 231 days.

(21) Appl. No.: 14/105,431

(22) Filed: Dec. 13, 2013

(65) Prior Publication Data
US 2014/0106193 A1    Apr. 17, 2014

Related U.S. Application Data

(63) Continuation of application No. PCT/KR2012/007526, filed on Sep. 20, 2012.

(30) Foreign Application Priority Data

Sep. 20, 2011    (KR) .................. 10-2011-0094779
Sep. 30, 2011    (KR) .................. 10-2011-0100272

(51) Int. Cl.
*H01M 10/04*    (2006.01)
*H01M 10/42*    (2006.01)
(Continued)

(52) U.S. Cl.
CPC ......... *H01M 10/42* (2013.01); *H01M 2/0275* (2013.01); *H01M 2/1077* (2013.01);
(Continued)

(58) Field of Classification Search
CPC .... H01M 2/22; H01M 2/0275; H01M 2/1077; H01M 10/0413; H01M 10/04; H01M 10/42; Y10T 29/4911
See application file for complete search history.

(56) References Cited

U.S. PATENT DOCUMENTS 6,242,128 B1    6/2001    Tura et al.
2001/0051298 A1    12/2001    Hanafusa et al.
(Continued)

FOREIGN PATENT DOCUMENTS

JP    H03-283268 A    12/1991
JP    2000-090979 A    3/2000
(Continued)

OTHER PUBLICATIONS

International Search Report for Application No. PCT/KR2012/007526 dated Feb. 26, 2013.
(Continued)

*Primary Examiner* — Muhammad S Siddiquee
(74) *Attorney, Agent, or Firm* — Nutter McClennen & Fish LLP; John J. Penny, Jr.

(57) ABSTRACT

The present invention relates to an electrode assembly of a porous structure and a secondary battery including the same. In an electrode assembly including a plurality of cathodes, anodes, and separators, the present invention provides a secondary battery including an electrode assembly including one or more through holes, and a passing sealing portion supplementarily sealed on positions corresponding to the through holes. The secondary battery according to the present invention may prevent the inner short and increase safety by including the fused portion of an electrode assembly and a battery case, stably fixing them, and holding back the movement of the electrode assembly. In addition, the present invention has an effect of being capable of greatly enhancing impregnation on electrolyte since the electrode assembly has a porous structure.

19 Claims, 7 Drawing Sheets

(51) Int. Cl.
*H01M 2/22* (2006.01)
*H01M 2/02* (2006.01)
*H01M 2/10* (2006.01)

(52) U.S. Cl.
CPC .............. *H01M 2/22* (2013.01); *H01M 10/04* (2013.01); *H01M 10/0413* (2013.01); *Y10T 29/4911* (2015.01)

(56) References Cited

U.S. PATENT DOCUMENTS

| | | | | |
|---|---|---|---|---|
| 2003/0099885 | A1* | 5/2003 | Kim | H01M 4/13 429/241 |
| 2005/0031946 | A1* | 2/2005 | Kruger | H01M 2/0212 429/159 |
| 2006/0093899 | A1* | 5/2006 | Jeon | H01M 2/1072 429/99 |
| 2007/0026303 | A1 | 2/2007 | Jeon et al. | |
| 2009/0305133 | A1 | 12/2009 | Yoon et al. | |

FOREIGN PATENT DOCUMENTS

| | | | |
|---|---|---|---|
| JP | 2000-340265 A | 12/2000 | |
| JP | 2005183820 A | 7/2005 | |
| JP | 2005235738 A | 9/2005 | |
| JP | 2006-073260 A | 3/2006 | |
| JP | 2007-018917 A | 1/2007 | |
| JP | 2007018917 * | 1/2007 | ............ H01M 10/04 |
| JP | 2007-250510 A | 9/2007 | |
| JP | 2008-159315 A | 7/2008 | |
| JP | 2008-159316 A | 7/2008 | |
| JP | 2008-293771 A | 12/2008 | |
| JP | 2009-158440 A | 7/2009 | |
| JP | 2011-090830 A | 5/2011 | |
| KR | 20010097437 A | 11/2001 | |
| KR | 1020010106396 | 11/2001 | |
| KR | 20020065293 A | 8/2002 | |
| KR | 20030059930 A | 7/2003 | |
| KR | 20070087276 A | 8/2007 | |
| WO | 94/10710 A1 | 5/1994 | |
| WO | 2007/037591 A1 | 4/2007 | |

OTHER PUBLICATIONS

Search Report from European Application No. EP 12832832.5, dated Jan. 13, 2015.

* cited by examiner

ELECTRODE ASSEMBLY WITH POROUS STRUCTURE AND SECONDARY BATTERY INCLUDING THE SAME

CROSS-REFERENCE TO RELATED APPLICATIONS

This application is a continuation of International Application No. PCT/KR2012/007526, filed Sep. 20, 2012, which claims the benefit of Korean Patent Application No. 10-2011-0094779 filed on Sep. 20, 2011, and Korean Patent Application No. 10-2011-0100272 filed on Sep. 30, 2011, the disclosures of which are incorporated by reference in their entirety herein.

TECHNICAL FIELD

The present invention relates to an electrode assembly with a porous structure and a secondary battery including the same.

BACKGROUND ART

As technology developments and demands for mobile devices increase, demands for batteries as an energy source are sharply increasing. Thus, many studies are being conducted on batteries that may satisfy various needs.

Typically, in terms of the shape of a battery, demands for polygonal secondary batteries and pouch type secondary batteries increase which may be applied to products, such as cellular phones, due to a thin thickness. And in terms of a material, demands for lithium secondary batteries, such as lithium ion batteries and lithium ion polymer batteries increase, since they have high energy densities, discharging voltages, and output stability.

FIG. 1 schematically illustrates the general structure of a typical pouch type secondary battery according to the related art, as an exploded perspective view.

Referring to FIG. 1, a pouch type secondary battery 100 is configured to include an electrode assembly 300, electrode tabs 310 and 320 extended from the electrode assembly 300, electrode leads 410 and 420 welded to the electrode tabs 310 and 320, and a battery case 200 storing the electrode assembly 300.

The electrode assembly 300 is an electricity generating element including cathodes and anodes sequentially stacked with a separator in between. The electrode assembly 300 is formed in a stacked or stacked/folded structure. The electrode tabs 310 and 320 are extended from each electrode plate of the electrode assembly 300, and the electrode leads 410 and 420 respectively are electrically connected by for example, welding to the plurality of electrode tabs 310 and 320 extended from each electrode plate, and are partially exposed to the outside of the battery case 200. In addition, an insulating film 430 is attached to a part of the top and bottom surfaces of the electrode leads 410 and 420 to increase sealing with the battery case 200 and simultaneously secure an electrical insulating state.

The case 200 is made of an aluminum laminate sheet, provides a space capable of storing the electrode assembly 300, and generally has a pouch shape. In case of a stacked type electrode assembly 300 as in FIG. 1, the inner upper end of the battery case 200 is spaced apart from the electrode assembly 300 at a predetermined gap so that a plurality of cathode tabs 310 and a plurality of anode tabs 320 may be together combined to the electrode leads 410 and 420.

In addition, since the electrode assembly 300 and the battery case 200 are just fixed by sealing the sealed part of the battery case together with the electrode leads 410 and 420, a fixing force is weak. Thus, there is a problem that the electrode assembly 300 moves in the battery case 200.

Meanwhile, FIG. 2 illustrates a partial expanded view of the inner upper end of a battery case where cathode tabs are combined in a dense form and connected to a cathode lead in the secondary battery of FIG. 1.

Referring to FIG. 2, a plurality of cathode tabs 310 extended and protruded from a cathode collector 301 of the electrode assembly 300 are connected to cathode lead 410 in a form of a fused portion integrally combined by for example, welding. The cathode lead 410 is sealed by the battery case 200, in a state that an opposite end 412 to which the fused portion for the cathode tabs has been connected is exposed.

Since the plurality of cathode tabs 310 are integrally combined to form a fused portion, the inner top end of the battery case 200 is spaced apart from the top surface of the electrode assembly 300 at a certain distance, and the cathode tabs 310 of the fused portion are bent in an approximately V shape.

Thus, the combined portion of the electrode tabs and the electrode lead is also referred to as a V-forming portion. For such a pouch type secondary battery, the electrode assembly easily moves along an interface with the battery case, due to the empty space of the V-forming portion when a battery vibrates or falls.

In particular, lithium salt-containing electrolyte injected into the inside of the battery case serves as a kind of lubricant at the interface of the electrode assembly and the battery case, thereby further accelerating the movement of the electrode assembly. Since this movement of the electrode assembly leads to inner short due to the contact of different electrodes at the V-forming portion, and eventually decreases the safety of a battery, there is a need for a way of being capable of securing safety in manufacturing a pouch type battery.

Regarding this, Japanese Laid-Open Patent Publication No. 2005-183820 provides a secondary battery that is configured to incorporate an electrode assembly including cathodes/separators/and anodes in upper and lower battery cases combined in a state of being insulated from each other. Adhesive layers formed of conductive adhesive and organic solvent included in electrolyte each are formed and thermally treated between an electrode forming the outer surface of the electrode assembly and the inner surface of the upper and lower cases. Thus, the electrode assembly is stably fixed to the inside of the battery case, and the electrode of the electrode assembly and the upper and lower cases are electrically connected to one another.

However, since in the technology above, the adhesive layer is manufactured from and coated with paste and exhibits an adhesive property by thermal treatment, there are drawbacks that a battery manufacturing process is generally complex and other components, such as electrode active materials and electrolyte are deteriorated during the thermal treatment process of the adhesive layer.

Thus, there is a big need for a technology capable of fundamentally solving general safety by preventing the movement of the electrode assembly inside the exterior member of a battery.

DISCLOSURE

Technical Problem

Thus, the present invention intends to solve problems according to the related art and a technical challenge requested from the past.

An object of the present invention is to provide a secondary battery that may prevent the inner short by stably fixing a battery case and an electrode assembly and holding back the movement of the electrode assembly, and may eventually secure excellent safety.

Another object of the present invention is to provide a secondary battery that includes an electrode assembly with enhanced impregnation on electrolyte.

A further object of the present invention is to provide a secondary battery module or a battery pack including a plurality of secondary batteries which are stably fixed.

Technical Solution

The present invention is devised to solve problems described above, and provides an electrode assembly including (a plurality of) cathode(s), anode(s), and separator(s), the electrode assembly including one or more through holes.

Further, the number of the one or more through holes may be two.

Further, the one or more through holes may be formed in any one shape selected from a group consisting of a circle, an ellipse, a curvature-polygon processed so that a vertex has a curvature, a quadrilateral, and a triangle. Specifically, the one or more through holes may be formed in a circle shape.

Further, the one or more through holes may be formed in the same shape.

Further, the one or more through holes may be formed with being spaced by the same gap.

Further, the one or more through holes may be formed along the central part of the electrode assembly in the longitudinal or transversal direction of the electrode assembly.

Further, the overall area occupied by the one or more through holes may be 2% to 20% of the surface area of the electrode assembly.

Further, the electrode assembly may be any one structure selected from jelly-rolled, stacked, stacked/folded and Z-stacked/folded structures.

In addition, the present invention provides a pouch type secondary battery including an electrode assembly, a pouch exterior member, and a passing sealing portion.

Further, the pouch exterior member may be formed in a structure of an inner resin layer, a metal thin film, and an outer resin layer.

Further, the passing sealing portion may be formed by sealing the corresponding part of the pouch exterior member that covers one or more through holes formed in the electrode assembly.

In addition, the present invention provides a battery module or a battery pack including the pouch type secondary battery as a unit battery.

Further, the battery module or the battery pack may be used as a power source of a middle/large sized device, and the middle/large sized device may include any one of a power tool; an electric vehicle (EV) including a hybrid electric vehicle (HEV) and a plug-in hybrid electric vehicle (PHEV); an electric two-wheeled vehicle comprising E-bike and E-scooter; an electric golf cart; an electric truck; an electric commercial vehicle; and a power storage system.

In addition, the present invention provides a method of manufacturing a pouch type secondary battery comprising a passing sealing portion, characterized by comprising: an electrode assembly that includes one or more through holes on the same position of a cathode, an anode, and a separator; and a pouch exterior member formed in a structure of an inner resin layer, a metal thin film, and an outer resin layer; and wherein a pouch exterior member of a position corresponding to the through holes formed on the electrode assembly is supplementarily sealed.

Further, the passing sealing portion may be manufactured using a heat fusion device that has a pressing unit corresponding to the position and shape of the through holes to be able to press a corresponding part.

In another aspect, the present invention provides a pouch type secondary battery including one or more through holes.

Further, the one or more through holes may be formed on at least one of an electrode assembly including a cathode, an anode, and a separator; and a pouch exterior member including the electrode assembly.

Further, the one or more through holes may be formed on the same position so that the through hole of the electrode assembly may correspond to the through hole of the pouch exterior member.

Further, the through hole of the electrode assembly and that of the pouch exterior member may be formed in the same shape.

Further, the size of the through hole of the electrode assembly may be larger than that of the corresponding through hole of the pouch exterior member.

At this point, the through hole of the electrode assembly may be larger than that of the pouch exterior member by the width of a supplementary sealing portion formed along the inner circumferential surface of the through hole of the electrode assembly.

Further, the one or more through holes may be formed with being spaced by the same gap.

Further, the one or more through holes may be formed along the central part of the pouch type secondary battery in the longitudinal or transversal direction of the pouch type secondary battery.

Further, a supplementary sealing portion may be formed along the inner circumferential surface of the through hole of the electrode assembly.

Further, the one or more through holes may be formed in any one shape selected from a group consisting of a circle, an ellipse, a curvature-polygon processed so that a vertex has a curvature, a quadrilateral, and a triangle. Specifically, the one or more through holes may be formed in a circle shape.

Further, the overall area occupied by the one or more through holes may be 2% to 20% of the area of the pouch type secondary battery.

Further, the electrode assembly may be any one structure selected from jelly-rolled, stacked, stacked/folded and Z-stacked/folded structures.

In addition, the present invention provides a battery module including a pouch type secondary battery as a unit battery.

Further, the battery module may be formed by connecting a cooling line through one or more through holes formed in the unit battery.

Further, the battery module may be formed by connecting a unit battery fixing bar through one or more through holes formed in the unit battery.

Further, the battery module may be used as a power source of a middle/large sized device, and the middle/large sized device may include any one of a power tool; an electric vehicle (EV) including a hybrid electric vehicle (HEV) and a plug-in hybrid electric vehicle (PHEV); an electric two-wheeled vehicle including E-bike and E-scooter; an electric golf cart; an electric truck; an electric commercial vehicle; and a power storage system.

Advantageous Effects

As described above, a secondary battery according to the present invention may prevent the inner short and increase safety by including the fused portion of an electrode assembly and a battery case, stably fixing them, and holding back the movement of the electrode assembly. In addition, the present invention has an effect of being capable of greatly enhancing impregnation on electrolyte since the electrode assembly has a porous structure.

Further, the present invention provides a secondary battery module or a battery pack that may further enhance the safety, performance, and lifespan of a secondary battery module or a battery pack that includes one or more secondary batteries by arranging and fixing or cooling a plurality of secondary batteries using the through hole of the secondary battery.

Those skilled in the art would be possible to make various applications and variations within the scope of the present invention based on the description above.

MODE FOR INVENTION

Figure 1:
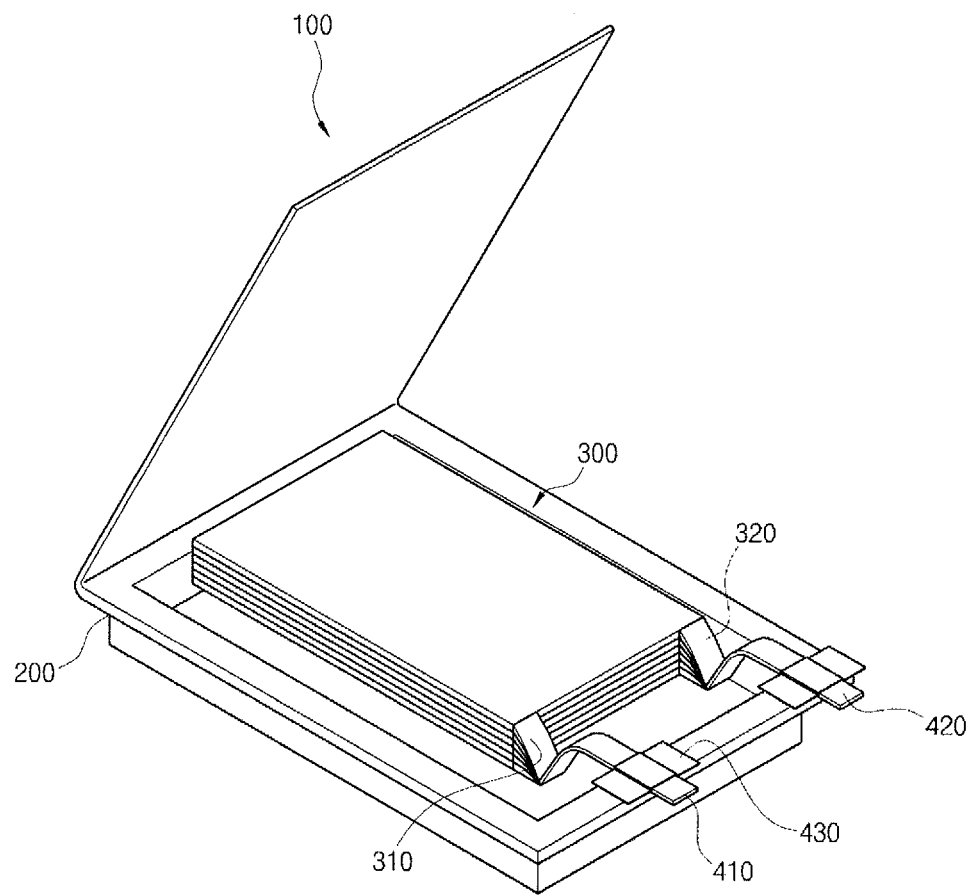
FIG. 1 is an exploded perspective view illustrating the general structure of a pouch type secondary battery according to the related art.
Figure 2:
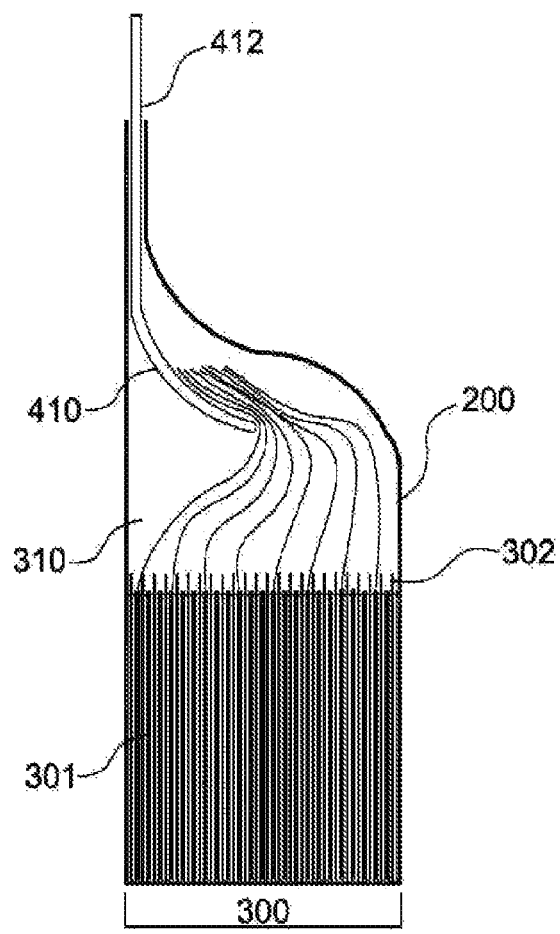
FIG. 2 illustrates a partial expanded view of the inner upper end of a battery case where cathode tabs are combined in a dense form and connected to a cathode lead in the secondary battery of FIG. 1.

To solve the related art as described above, the present invention provides an electrode assembly including (a plurality of) cathode(s), anode(s), and separator(s), the electrode assembly including one or more through holes for sealing. The present invention also provides a secondary battery including the electrode assembly.

In addition to the sealing portion on the corner of a battery exterior member, a secondary battery according to the present invention may further seal an electrode assembly and a battery exterior member through the one or more through holes for sealing to hold back the electrode assembly from moving inside the battery exterior member and enhance safety when external forces are applied, such as a fall and an external impact. In particular, when it is used as a power source of a middle/large sized device, such as a battery vehicle where there are a lot of external impacts or shaking, it may prevent risks due to the movement of the electrode assembly, such as inner short, corresponding heating, and ignition and greatly increase safety.

The shape of the through hole is not particularly limited but may be formed in various shapes, such as a circle, an ellipse, and others, including a curvature figure processed so that a vertex has a curvature, a quadrilateral, and a triangle. Regarding this, the through hole is preferably formed in a shape without a corner or an angle to prevent an electrode or a separator included in the electrode assembly from becoming torn or damaged. Thus, the through hole is preferably formed in a circle shape.

In addition, the size and number of the through holes are not particularly limited, but various designs are possible depending on the use and shape of a battery. Regarding this, if the size of the through hole is too large or the number of the through holes is too many, it may be disadvantageous in terms of capacity of a battery. Thus, the through hole is preferably formed as minimum size and number in which the electrode assembly may be fixed to the battery exterior member.

More specifically, it may have a configuration where the overall area occupied by the through hole is 2% to 20% of the area of the electrode assembly. The reason is that if the percentage occupied by the through hole increases to be beyond the range, there may be a problem that the capacity of the battery decreases, and that if not reaching the percentage, it is difficult to effectively fix the electrode assembly to the battery exterior member.

In an embodiment of the invention, a plurality of through holes of a small size may be evenly distributed and formed on the electrode assembly within the percentage of the area above, and a minimum number of through holes of a larger size than that may be formed in a manner that two through holes are formed on both ends being symmetrical in a longitudinal direction based on the center of the electrode assembly to enable the electrode assembly to be fixed to the battery exterior member.

At this point, the area of one through hole is preferably formed to become 1% to 10% of the surface area of the overall electrode assembly.

For convenience of processes, it is preferable that only two through holes are formed on a point capable of becoming the center of gravity of the electrode assembly, that is, both ends thereof being symmetrical in a longitudinal direction based on the center of the electrode assembly, since the sealing with the battery exterior member may be easier and more convenient. For example, the through hole may be formed on a position that is spaced with respect to the length L of the longitudinal direction of the electrode assembly by L/6 from both ends.

Meanwhile, the through hole may be formed in manner that an electrode assembly including a plurality of electrodes and separators is assembled and then the through hole passes through it at a time. Alternatively, an electrode assembly where a through hole is formed may be manufactured using an electrode and a separator where the same through hole has already been formed in a predetermined shape and on a predetermined position.

An electrode assembly of the present invention may include one or more through holes therein to fix the electrode assembly. Further, the electrode assembly of the present invention may greatly increase the impregnation of electrolyte.

In general, it is true that the impregnation of electrolyte decreases since it is difficult for electrolyte to permeate the inside of the electrode assembly. However, since the electrode assembly of the present invention includes one or more through holes inside the electrode assembly, and electrolyte may permeate the inside of the electrode assembly through the through holes, thus, it has an effect that the impregnation of the electrolyte of the electrode assembly may greatly increase.

Meanwhile, the shape of the electrode assembly according to the present invention is not particularly limited, but may be any one of a jelly-rolled electrode assembly that has a structure where a separator is interposed between a cathode and an anode in an elongated sheet shape and is wound; a stacked and folded electrode assembly that includes a cathode, an anode, and a separator, arranges a plurality of unit cells with both far-most electrodes of the same or different electrodes on an elongated filmed separator and then winds the unit cells in single direction; a Z-stacked and folded electrode assembly that winds the elongated filmed separator in zigzag direction; and a stacked electrode assembly that has a structure where a plurality of unit cells are stacked.

The present invention provides a secondary battery that includes the electrode assembly described above and further includes a passing sealing portion. The passing sealing portion is formed by supplementarily sealing a battery exterior member on the through hole part of the electrode assembly.

The secondary battery may form the passing sealing portion in a manner that after putting the electrode assembly in the battery exterior member, the sealing portion of the surrounding corner of the battery exterior member and the battery exterior member of a part on the electrode assembly where the through hole is located are thermally fused by a heat fusion jig.

The formation of such a passing sealing portion may be possibly manufactured using a heat fusion jig that is configured to enable heat compression in the same shape and on the same part to those of the through hole located on the electrode assembly, but the formation is not limited to that way.

At this point, the secondary battery may be one where a cathode lead and an anode lead are protruded in the same direction or alternatively, they are protruded in the opposite direction.

In addition, the battery exterior member may be formed such that an electrode assembly storage space that is formed to be able to store an electrode assembly is formed on any one of its upper and lower portions or alternatively, it is formed on both of its upper and lower portions.

Meanwhile, the pouch type exterior member may be formed using a well-known exterior member. For example, the pouch type exterior member preferably has a laminate sheet shape including a metal layer and a resin layer. In particular, a pouch type exterior member in an aluminum laminate sheet is preferable. The laminate sheet includes an outer coated layer made of a polymeric film, a barrier layer made of a metal foil, and a polyolefin-based inner sealant layer. Since the outer coated layer must have outstanding resistance to an external environment, it needs to have tensile strength exceeding a predetermined value, and weatherproof. In this regard, an elongation nylon film or polyethylene terephthalate (PET) may preferably be used as a polymeric resin for the outer resin layer. The barrier layer may be formed specifically using aluminum to exhibit functions of preventing foreign materials, such as gas, moisture, etc. from entering or going out and of enhancing the strength of a battery case. As the inner sealant layer, a polyolefin-based resin may be used which has low absorption property and is not inflated or eroded by electrolyte, to hold back the permeation of electrolyte and to having heat fusion property (a heat adhesive property). More specifically, non-elongating polypropylene (cPP) may be used.

Further, the outer coated layer and the inner sealant layer may be formed as two or more layers. For example, the outer coated layer and the inner sealant layer may respectively be formed in but are not limited to a double structure, such as PET/ONy layers and PPa (Acid modified) PP/cPP layers.

In addition, the electrode leads may be formed of, but are not limited to, one or more kinds of metal selected from a group consisting of for example, aluminum, stainless-steel, copper, nickel, titan, tantalum and niobium, in case of a cathode.

The electrode leads may preferably be formed of, but are not limited to, one or more kinds of metal selected from a group consisting of for example, copper, nickel, stainless-steel, and their alloy, in case of an anode. As a bonding method of that, a well-known technique, such as laser or ultrasonic welding may be used, but is not particularly limited to that method.

The secondary battery according to the present invention may not only be used for a battery cell used as a power source of a small-sized device but also preferably be used for a middle/large sized battery module or battery pack including a plurality of battery cells capable of being used as the power source of a middle/large sized device, as a unit battery.

The middle/large sized device may include but is not limited to a power tool; an electric vehicle comprising an electric vehicle (EV), a hybrid electric vehicle (HEV), and a plug-in hybrid electric vehicle (PHEV); an electric two-wheeled vehicle comprising E-bike and E-scooter; an electric golf cart; an electric truck; an electric commercial vehicle; and a power storage system.

The present invention is described in detail below with reference to the accompanying drawings, but this is intended for easier understanding of the present invention and the scope of the present invention is not limited by the description.

Figure 3:
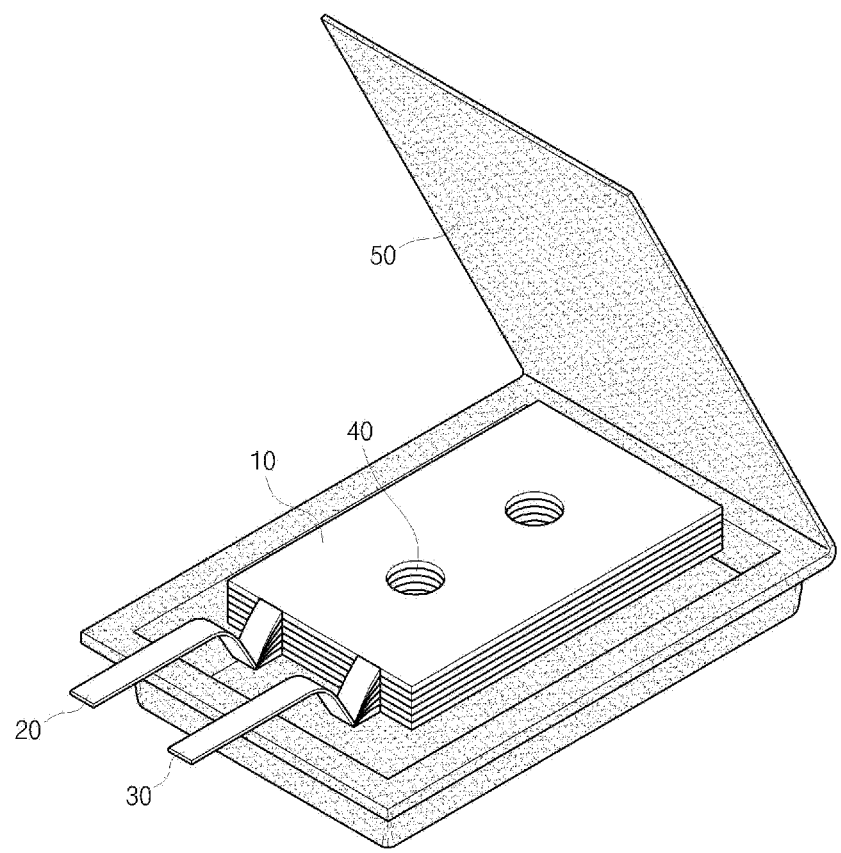
FIG. 3 is an exploded perspective view of a secondary battery according to an embodiment of the present invention.

FIG. 3 schematically illustrates an exploded perspective view of a secondary battery according to an embodiment of the present invention.

In the pouch type battery of FIG. 3, some matters except for the characteristic matters of the present invention are approximately the same as a pouch type battery according to the related art generally used. Thus, some matters except for the characteristic matters of the present invention may be not described.

Referring to FIG. 3, the pouch type secondary battery according to the present invention includes an electrode assembly 10 having a plurality of through holes 40, and a battery exterior member 50.

Two through holes 40 may be formed on the symmetrical positions of both ends in the longitudinal direction of the electrode assembly as in FIG. 3, but the present invention is not limited to this and may freely be designed by those skilled in the art.

The battery exterior member 50 included in the present invention may use a well-known pouch type battery exterior member conventionally used.

Figure 4:
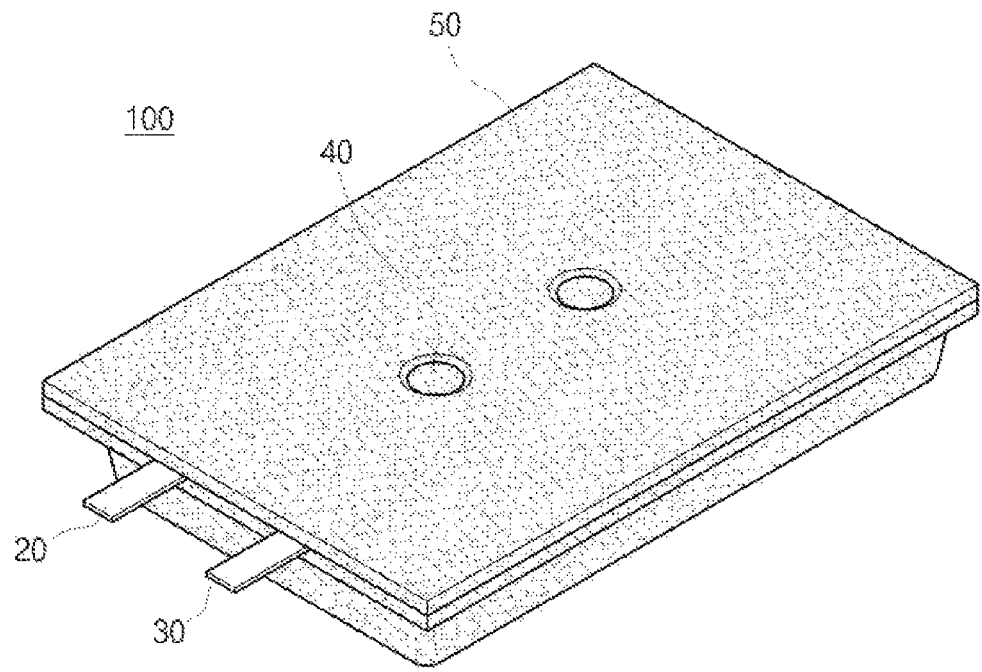
FIG. 4 is a perspective view illustrating the combined state of a secondary battery according to FIG. 3.
Figure 5:
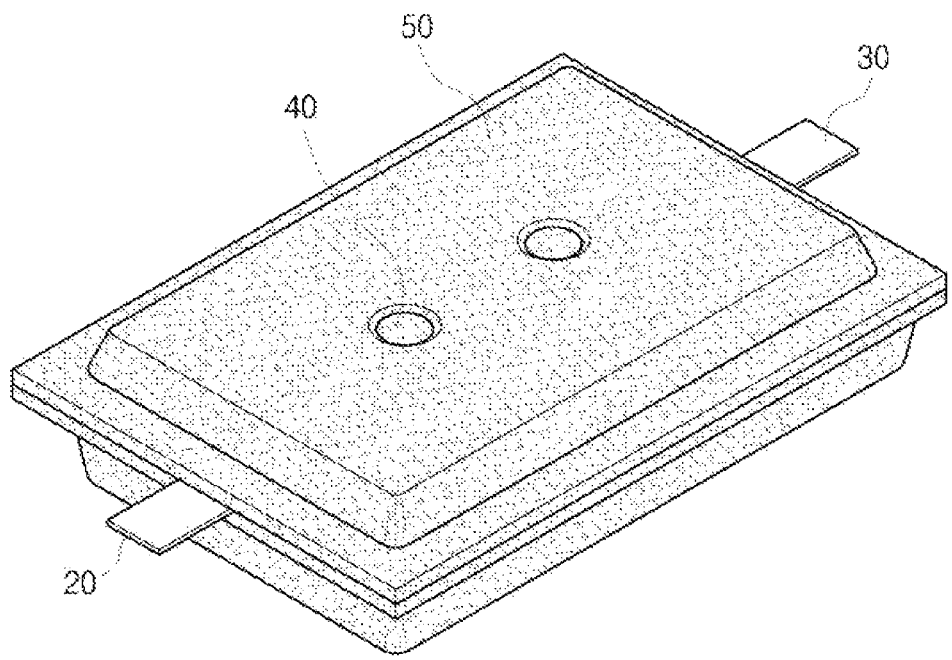
FIG. 5 is a perspective view illustrating the combined state of a secondary battery according to another embodiment.

FIGS. 4 and 5 are perspective views of a secondary battery while storing an electrode assembly and sealing a battery exterior member.

Referring to FIG. 4, in the secondary battery according to the present invention, a part of a battery exterior member contacting a part of the through hole formed on the stored electrode assembly is supplementarily sealed using a technique including heat fusion to form a passing sealing portion, and thus to completely fix and integrate the electrode assembly and the battery exterior member.

The supplementary sealing step forming the passing sealing portion is not particularly limited in order. The passing sealing portion may be formed by sealing simultaneously when sealing the corner sealing portion of the battery exterior member or may be formed by finally supplementarily sealing after carrying out the activation of a secondary battery.

The formation of the passing sealing portion may be formed but is not limited to using a jig that is formed to be able to apply heat and pressure to the battery exterior member corresponding to a position where the through hole of the electrode assembly is formed.

FIG. 4 is a perspective view of a secondary battery where a cathode lead 20 and an anode lead 30 are protruded in the same direction and the storage portion of an electrode assembly is formed only on a lower battery exterior member. FIG. 5 is a perspective view of a secondary battery where a cathode lead 20 and an anode lead 30 are protruded in different directions and the storage portion of an electrode assembly is formed on both lower and upper battery exterior members.

The secondary battery according to the present invention may have an uneven portion caved in by sealing, on a part of a passing sealing portion. The cross section of the passing sealing portion may preferably be formed in but is not limited to a "\_____/" shape to prevent a pouch type electrode assembly from becoming damaged.

The present invention will be described more in detail below through particular embodiments, but the following embodiments are intended only for illustrating the effect of the present invention and the scope of the present invention is not limited to these.

Embodiment 1

As in FIG. 3, electrode assembly with two circular through holes of a size corresponding to 3% of the surface area of an electrode assembly is formed, and the two through holes are spaced by a gap of ⅙ of the length of the electrode assembly from both ends of the electrode assembly.

The electrode assembly is stored in a battery exterior member and the positions of the corner sealing portion of a battery exterior member and the through hole is thermally fused using a heat fusion jig. Thus, a secondary battery including a passing sealing portion is manufactured.

Comparative Embodiment 1

Except for not forming the through hole and the passing sealing portion, a battery is manufactured in the same method as Embodiment 1.

Experimental Example 1

A forward fall experiment was carried out on the batteries manufactured each from Embodiment 1 and Comparative embodiment 1 and its result is represented in Table 1 below.

This experiment each was repetitively carried out on 20 batteries and the forward fall experiment was carried out by making a free fall of the batteries onto a steel plate 100 times at a height of 180 cm so that a part of an electrode terminal headed downwardly.

TABLE 1

| | Number of Batteries Causing Short When Falling |
|---|---|
| Embodiment 1 | 0 |
| Comparative embodiment 1 | 15 |

As illustrated in Table 1, the batteries in Embodiment 1 according to the present invention did not cause short for all the 20 batteries in the fall experiment. In other words, since a supplementary passing sealing portion was formed on an electrode assembly and a battery exterior member, the electrode assembly did not move even when falling, thereby preventing the inner short of the secondary battery.

On the contrary, for the majority of the batteries according to Comparative embodiment 1, the deformation and inner short of a battery were found since the electrode assembly inside a battery exterior member deviated or moved while falling approximately 85 times. In addition, in the batteries of Comparative embodiment 1, it was found that the amount of electrolyte injected in a process of injecting electrolyte was much less than a desired amount of injection. In other words, after injecting electrolyte, a comparison was made on an amount of impregnation of electrolyte by an electrode assembly in the same temporal condition (5 minutes). As a result, the batteries of Comparative embodiment 1 represented the impregnation of approximately 60% when compared to the batteries of Embodiment 1.

Thus, it may be recognized that a much longer time needs in order for the batteries of Comparative embodiment 1 to represent the same amount of electrolyte impregnation. This means that a manufacturing process time for a battery must be extended to be long time.

In addition, according to another aspect of the present invention, a pouch type secondary battery including one or more through holes is provided.

At this point, the through holes are formed on an electrode assembly including a cathode, an anode, and a separator, and on a pouch exterior member including the electrode assembly. The through hole of the electrode assembly and that of the pouch exterior member are formed on the same position to be able to correspond to each other. Thus, a secondary battery including one or more through holes is formed.

The secondary battery according to the present invention may more rigidly fix the electrode assembly to the pouch exterior member through the through holes to prevent the electrode assembly from moving inside the pouch exterior member and to enhance safety when external forces, such as a fall and an external impact are applied.

In particular, when it is used as a power source of a middle/large sized device, such as a battery vehicle where there are a lot of external impacts or shaking, it may prevent inner short due to the movement of the electrode assembly, corresponding risks of heating and ignition and greatly increase safety.

The shape of the through hole formed in the secondary battery is not particularly limited and may be formed in various shapes, such as a circle, an ellipse, and others, including a curvature figure processed so that a vertex has a curvature, a quadrilateral, and a triangle. Regarding this, the through hole is preferably formed in a shape without a corner or an angle to prevent an electrode or a separator included in the electrode assembly from becoming torn or damaged. Thus, the through hole is preferably formed in a circle shape.

In shape, the through hole of the electrode assembly and that of the pouch exterior member may be different from each other or may be the same, specifically those may be formed as circles with a same shape.

In addition, the size of the through hole of the electrode assembly and that formed on the pouch exterior member are not particularly limited but it is preferable that the through hole of the electrode assembly is larger than the corresponding through hole of the pouch exterior member in size.

This is intended for forming a supplementary sealing portion by the pouch exterior member along the inner circumferential surface of the through hole of the electrode assembly. Accordingly, it may be satisfied if the size of the through hole of the electrode assembly is such larger than the size of the corresponding through hole of the pouch exterior member that the supplementary sealing portion may be formed.

In addition, the size and number of the through holes according to the present invention are not particularly limited, but various designs are possible depending on the use and shape of a battery. Regarding this, if the size of the through hole is too large or the number of the through holes is too many, it may be disadvantageous in terms of capacity of a battery. Thus, the through hole is preferably formed as minimum size and number in which the electrode assembly is fixed to the battery exterior member.

More specifically, it may have a configuration where the overall area occupied by the through hole is within 2% to 20% of the area of the electrode assembly. The reason is that if the percentage occupied by the through hole increases to be beyond the range, there may be a problem that the capacity of the battery decreases, and that if not reaching the percentage, it is difficult to effectively fix the electrode assembly to the battery exterior member.

In an embodiment of the invention, a plurality of through holes of a small size may be evenly distributed and formed on the plane of the secondary battery within the percentage of the area above, and at this point, the through holes are preferably formed to be spaced at the same gap.

In an embodiment, the through holes may be arranged on the central part of a battery along the longitudinal or transversal side of a pouch type secondary battery in a row.

At this point, through holes formed on both ends are formed to be spaced apart from ends at the same gap, and specifically a minimum number of through holes may be formed in a manner that two through holes are formed on positions spaced apart from both ends at the same gap and symmetrical based on the center to enable the electrode assembly to be fixed to the battery exterior member.

At this point, the area of one through hole is preferably formed to become 1% to 10% of the surface area of the overall secondary battery. For convenience of processes, it is preferable that only two through holes are formed on both ends being symmetrical in a longitudinal direction based on a point capable of becoming the center of gravity of the secondary battery, that is, center of the electrode assembly, since the sealing with the battery exterior member may be easier and more convenient. For example, the through hole may be formed on a position that is spaced with respect to the length L of the longitudinal direction of the secondary battery by L/6 from both ends.

Meanwhile, the through hole may be formed in manner that an electrode assembly including a plurality of electrodes and separators is assembled, then stored in a battery exterior member and sealed, and the through hole is formed and supplementarily sealed. Alternatively, it may be manufactured, using an electrode assembly where a through hole is formed using an electrode and a separator where the same through hole has already been formed in a predetermined shape and on a predetermined position, and using a battery exterior member where a through hole is formed on the corresponding position.

The electrode assembly of the present invention described above may include one or more through holes therein to fix the electrode assembly. Further, the electrode assembly of the present invention may greatly increase the impregnation of electrolyte.

In general, it is true that the impregnation of electrolyte decreases since it is difficult for electrolyte to permeate the inside of the electrode assembly. However, since the electrode assembly of the present invention includes one or more through holes therein and electrolyte may permeate the inside of the electrode assembly through the through holes, it has an effect that the impregnation of the electrolyte of the electrode assembly may greatly increase.

Regarding this, in case of using a battery exterior member where a through hole already formed, it is preferable to inject electrolyte and activate a battery after a sealing process on a part of the thorough hole completely ends. The reason is that it has a risk of leaking electrolyte, otherwise.

Meanwhile, the shape of the electrode assembly according to the present invention is not particularly limited, but may be any one of a jelly-rolled electrode assembly that has a structure where a separator is interposed between a cathode and an anode in an elongated sheet shape and is wound; a stacked and folded electrode assembly that includes a cathode, an anode, and a separator, arranges a plurality of unit cells with both far-most electrodes of the same or different electrodes on an elongated filmed separator and then winds the unit cells in single direction; a Z-stacked and folded electrode assembly that winds the elongated filmed separator in zigzag direction; and a stacked electrode assembly that has a structure where a plurality of unit cells are stacked.

In addition, the secondary battery according to the present invention may form the passing portion in a manner that after putting the electrode assembly in the battery exterior member, the sealing portion of the surrounding corner of the battery exterior member and a part of the battery exterior member where the through hole has been located are thermally fused by a heat fusion jig, or a punching technique, etc. is used after heat fusion.

The formation of such a passing portion may be possible but not limited to using a heat fusion jig configured to enable heat compression on a part of same shape and same position with the through hole.

At this point, the size of the through hole may be formed to be smaller than that of the through hole formed on the electrode assembly. This is because the inside of the through hole needs a sealing margin for a battery exterior member to be able to be sealed. Meanwhile, the sealing portion of the battery exterior member formed along the inner circumferential surface of the through hole on the secondary battery is preferably arranged on a battery module to bend the sealing margin in any one direction so that a fixing bar or a cooling line is easily installed.

Meanwhile, the secondary battery according to the present invention may be one where a cathode lead and an anode lead are protruded in the same direction or alternatively, they are protruded in the opposite direction.

In addition, the battery exterior member may be formed such that an electrode assembly storage space formed to be able to store an electrode assembly is formed on any one of its upper and lower portions or alternatively, it is formed on both of its upper and lower portions.

Meanwhile, the pouch exterior member may be formed using a well-known exterior member. For example, the pouch type exterior member preferably has a laminate sheet shape including a metal layer and a resin layer. In particular, a pouch type exterior member in an aluminum laminate sheet is preferable. The laminate sheet includes an outer coated layer made of a polymeric film, a barrier layer made of a metal foil, and a polyolefin-based inner sealant layer. Since the outer coated layer must have outstanding resistance to an external environment, it needs to have tensile strength exceeding a predetermined value, and weatherproof. In this regard, an elongating nylon film or polyethylene terephthalate (PET) may preferably be used as a polymeric resin for the outer resin layer. The barrier layer may be formed specifically using aluminum to exhibit functions of preventing foreign materials, such as gas, moisture, etc. from entering or going out and of enhancing the strength of a battery case. As the inner sealant layer, a polyolefin-based resin may be preferably used which has low absorption property and is not inflated or eroded by electrolyte, to hold back the permeation of electrolyte and to having heat fusion property (a heat adhesive property). More specifically, non-elongating polypropylene (cPP) may be used.

Further, the outer coated layer and the inner sealant layer may be formed as two or more layers. For example, the outer coated layer and the inner sealant layer may respectively be formed in but are not limited to a double structure, such as PET/ONy layers and PPa (Acid modified) PP/cPP layers.

In addition, the electrode leads may be formed of, but are not limited to, one or more kinds of metal selected from a group consisting of for example, aluminum, stainless-steel, copper, nickel, titan, tantalum and niobium, in case of a cathode.

The electrode leads may preferably be formed of, but are not limited to, one or more kinds of metal selected from a group consisting of for example, copper, nickel, stainless-steel, and their alloy, in case of an anode. As a bonding method of that, a well-known technique, such as laser or ultrasonic welding may be used, but is not particularly limited to that method.

The secondary battery according to the present invention may not only be used for a battery cell used as a power source of a small-sized device but also preferably be used for a middle/large sized battery module or battery pack including a plurality of battery cells capable of being used as the power source of a middle/large sized device, as a unit battery.

As described above, a battery module or a battery pack including a secondary battery according to the present invention in plurality may prevent a plurality of secondary batteries from deviating or moving by external shaking or impact by installing a fixing bar through a through hole formed on the secondary battery. Alternatively, the battery module or a battery pack has effects of capable of preventing overheating due to the usage of a battery and further preventing heating and ignition in case of emergency by installing a cooling line through the through hole.

At this point, the middle/large sized device may include but is not limited to a power tool; an electric vehicle comprising an electric vehicle (EV), a hybrid electric vehicle (HEV), and a plug-in hybrid electric vehicle (PHEV); an electric two-wheeled vehicle comprising E-bike and E-scooter; an electric golf cart; an electric truck; an electric commercial vehicle; and a power storage system.

The present invention is described in detail below with reference to the accompanying drawings, but this is intended for easier understanding of the present invention and the scope of the present invention is not limited by the description.

FIG. 3 schematically illustrates an exploded perspective view of a secondary battery according to an embodiment of the present invention.

In the pouch type battery of FIG. 3, some matters except for the characteristic matters of the present invention are approximately the same to a pouch type battery according to the related art generally used. Thus, some matters except for the characteristic matters of the present invention may be not described.

Referring to FIG. 3, the pouch type secondary battery according to the present invention includes an electrode assembly 10 where a plurality of through holes 40 formed, and a battery exterior member 50.

Two through holes 40 may be formed on the symmetrical positions of both ends in the longitudinal direction of the electrode assembly as in FIG. 3, but the present invention is not limited to this and may freely be designed by those skilled in the art.

The battery exterior member 50 included in the present invention may use a well-known pouch type battery exterior member conventionally used, or may use a battery exterior member where a through hole smaller than that of the electrode assembly is formed on the position corresponding to the thorough hole 40 formed in the electrode assembly. In this case, the reason the size of the through hole formed in the battery exterior member is smaller than that of the electrode assembly is because the battery exterior member needs a sealing margin for sealing a battery exterior member along the inner circumferential surface of the through hole.

Figure 6:
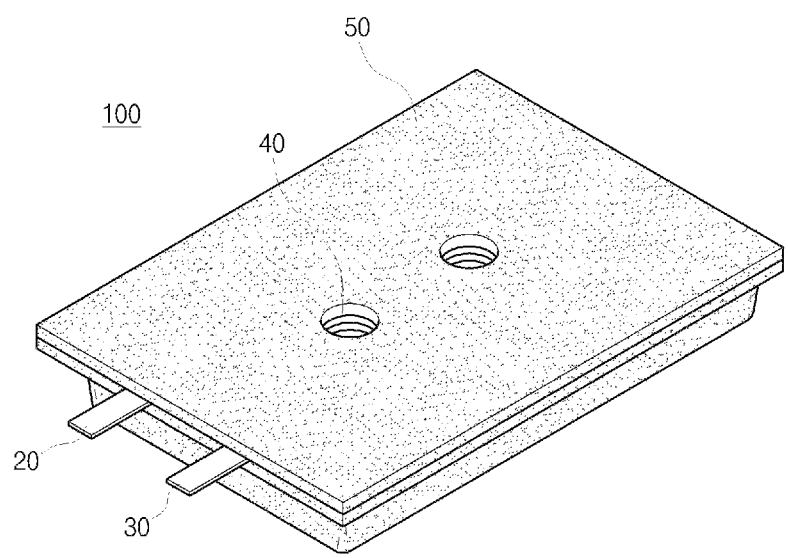
FIG. 6 is a perspective view illustrating the sealed state of a secondary battery according to FIG. 3.

FIG. 6 is a perspective view of a secondary battery according to the present invention.

The secondary battery according to the present invention includes a through hole 40 passing through the secondary battery as in FIG. 6, and a sealing portion where the battery exterior member is sealed along the inner circumferential surface of the sealing portion is formed inside the through hole.

The secondary battery according to the present invention completely fixes the electrode assembly to the battery exterior member by supplementary sealing through the through hole and integrates them.

The supplementary sealing process by the formation of the through hole is not particularly limited in order. The inner circumferential surface of the through hole may be sealed simultaneously when sealing the corner sealing portion of the battery exterior member, or may be formed by finally supplementarily sealing after carrying out the activation of a secondary battery. Regarding this, if a through hole is already formed in the battery exterior member, it is preferable to seal the inner circumferential surface of the through hole together when forming the corner sealing portion of the battery exterior member. The reason is to make an electrolyte injection process easy.

The formation of the through hole may be formed but is not limited to using a jig designed to be able to apply sealing pressure to a corresponding position depending on the position and shape of a through hole.

FIG. 6 is a perspective view of a secondary battery where a cathode lead 20 and an anode lead 30 are protruded in the same direction and the storage portion of an electrode assembly is formed only on a lower battery exterior member, but is not limited to this.

Figure 7:
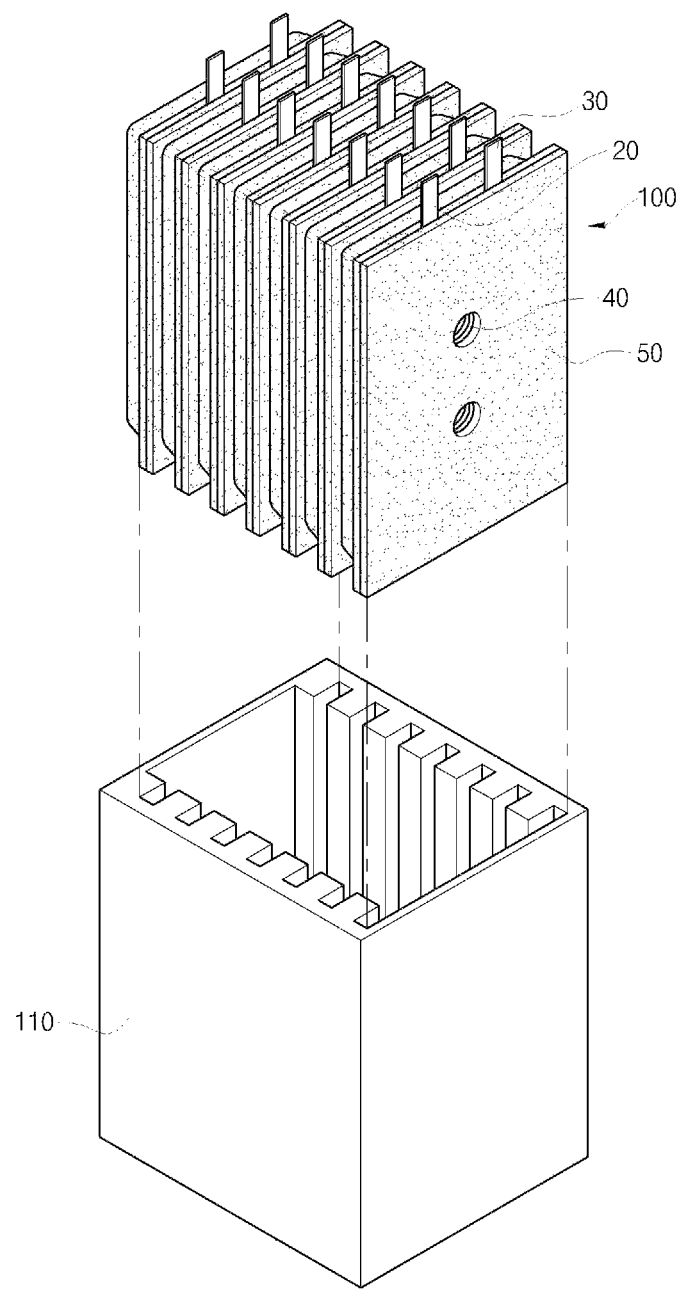
FIG. 7 is an exploded perspective view illustrating a secondary battery module including a secondary battery according to FIG. 3 in plurality.
Figure 8:
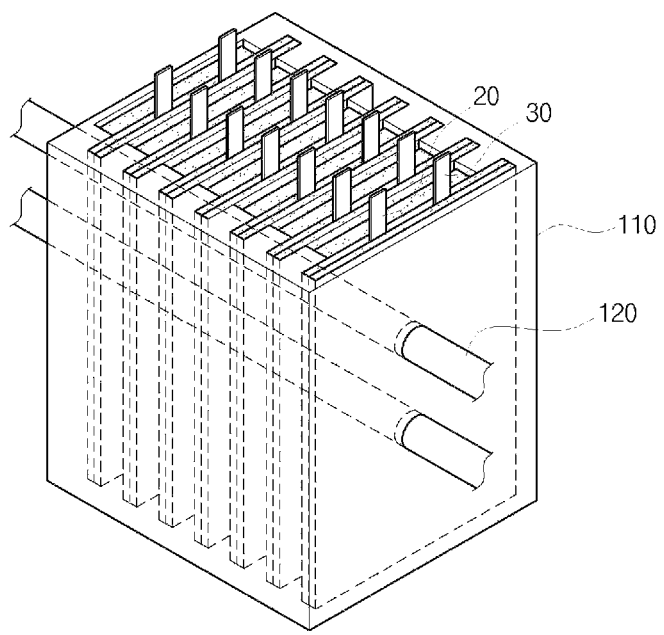
FIG. 8 is an exploded perspective view illustrating an embodiment where a cooling line is connected through the through hole of a secondary battery, in the secondary battery module.

FIG. 7 is for a battery module 110 including a secondary battery 50 according to the present invention in plurality, FIG. 8 is a perspective view of an embodiment where a fixing bar or a cooling line 120 is installed through the through holes 40 formed in the secondary batteries.

The battery module according to the present invention may prevent a battery from deviating or moving due to external pressure by fixing a plurality of secondary batteries through the through holes, or greatly enhance the safety of a battery module by keeping a unit battery at a moderate temperature through the cooling line, and provide an effect of being capable of improving performance and lifespan.

The present invention will be described more in detail below through particular embodiments, but the descriptions are for illustrating the effect of the present invention, and the scope of the present invention is not limited to these.

Embodiment 2

As in FIG. 6, a secondary battery with two circular through holes of a size corresponding to 3% of the surface area of a secondary battery is formed in a position spaced from both ends of the secondary battery by a gap of ⅙ of the length of the secondary battery.

This uses an electrode assembly and a battery exterior member therein through holes are already formed, and the through hole is formed by thermally fusioning the corner sealing portion of the battery exterior member and the sealing margin of the battery exterior member of the inner circumferential surface of the through hole using a heat fusion jig.

Comparative Embodiment 2

Except for not forming the through hole, a secondary battery is manufactured in the same method as Embodiment 2.

Experimental Example 2

A forward fall experiment was carried out on the batteries manufactured each from Embodiment 2 and Comparative embodiment 2 and its result is represented in Table 2 below.

This experiment each was repetitively carried out on 20 batteries and the forward fall experiment was carried out by making a free fall of the batteries onto a steel plate 100 times at a height of 180 cm so that a part of an electrode terminal headed downwardly.

TABLE 2

|  | Number of Batteries Causing Short When Falling |
| --- | --- |
| Embodiment 2 | 0 |
| Comparative embodiment 2 | 15 |

As illustrated in Table 2 above, the batteries in the embodiment according to the present invention did not cause short for all the 20 batteries in the fall experiment. In other words, since a supplementary passing sealing portion was formed on an electrode assembly and a battery exterior member, the electrode assembly did not move even when falling, thereby preventing the inner short of the secondary battery.

On the contrary, for the majority of the batteries according to Comparative embodiment 2, the deformation and inner short of a battery were found since the electrode assembly inside a battery exterior member deviated or moved while falling approximately 85 times.

In addition, in the batteries of Comparative embodiment 2, it was found that the amount of electrolyte injected in a process of injecting electrolyte was much less than a desired amount of injection. In other words, after injecting electrolyte, a comparison was made on an amount of impregnation of electrolyte by an electrode assembly in the same temporal condition (5 minutes). As a result, the batteries of Comparative embodiment 2 represent the impregnation of approximately 60% when compared to the batteries of Embodiment 2.

Thus, it may be recognized that a much longer time needs in order for the batteries of Comparative embodiment 2 to represent the same amount of electrolyte impregnation. This means that a manufacturing process time for a battery must be extended to be long time.

The descriptions above just illustrate the technical idea of the present invention by examples, and those skilled in the art may make various modifications and variations without departing from the essential characteristics of the present invention. Thus, as the embodiments disclosed herein are intended not to limit but to describe the technical idea of the present invention, the scope of protection of the present invention should be construed by the claims below and all the technical ideas falling within the equivalent scope to those should be construed to be included in the scope of a right of the present invention.

DESCRIPTIONS OF REFERENCE NUMERALS

10 ELECTRODE ASSEMBLY
20 CATHODE LEAD
30 ANODE LEAD
40 THROUGH HOLE, PASSING SEALING PORTION
50 BATTERY EXTERIOR MEMBER
120 COOLING LINE
110 BATTERY MODULE

The invention claimed is:

1. A battery module comprising:
a pouch type secondary battery comprising an electrode assembly, a pouch exterior member, and a passing sealing portion,
wherein the electrode assembly comprises a cathode, an anode, and a separator,
wherein the electrode assembly comprises one or more through holes,
wherein the pouch exterior member comprises one or more through holes formed within a substantially planar section of a sheet of the pouch exterior member that correspond with the one or more through holes of the electrode assembly such that the one or more through holes of the pouch exterior member are outside a thickness-directional periphery of the electrode assembly,
wherein the battery module is formed by connecting a unit battery fixing bar through the one or more through holes of the electrode assembly and the one or more through holes of the pouch exterior member,
wherein a size of one of the one or more through holes of the electrode assembly is larger than a size of a corresponding one of the one or more through holes of the pouch exterior member,
wherein a supplementary sealing portion is formed along an inner circumferential surface of the one of the one or more through holes of the electrode assembly to prevent inner short of the secondary battery, and wherein the supplementary sealing portion is configured to bend in any direction to accommodate installation of the unit battery fixing bar.

2. The battery module according to claim 1, wherein the number of the one or more through holes of the electrode assembly is two.

3. The battery module according to claim 1, wherein the one or more through holes of the electrode assembly are formed in any one shape selected from a group consisting of a circle, an ellipse, a curvature-polygon processed so that a vertex has a curvature, a quadrilateral, and a triangle.

4. The battery module according to claim 3, wherein the one or more through holes of the electrode assembly are formed in a circle shape.

5. The battery module according to claim 1, wherein the one or more through holes of the electrode assembly are formed in the same shape.

6. The battery module according to claim 1, wherein the one or more through holes of the electrode assembly are formed with being spaced by the same gap.

7. The battery module according to claim 1, wherein the one or more through holes of the electrode assembly are formed along a central part of the electrode assembly in a longitudinal direction of the electrode assembly.

8. The battery module according to claim 1, wherein the one or more through holes of the electrode assembly are formed along a central part of the electrode assembly in a transversal direction of the electrode assembly.

9. The battery module according to claim 1, wherein the overall area occupied by the one or more through holes of the electrode assembly is 2% to 20% of a surface area of the electrode assembly.

10. The battery module according to claim 1, wherein the electrode assembly is any one structure selected from jelly-rolled, stacked, stacked/folded and Z-stacked/folded structures.

11. The battery module according to claim 1, wherein the pouch exterior member is formed in a structure of an inner resin layer, a metal thin film, and an outer resin layer.

12. The battery module according to claim 1, wherein the passing sealing portion is formed by sealing the corresponding part of the pouch exterior member that covers the one or more through holes of the electrode assembly.

13. The battery module according to claim 1, wherein the battery module is used as a power source of a middle/large sized device, and the middle/large sized device includes any one of a power tool; an electric vehicle comprising an electric vehicle (EV), a hybrid electric vehicle (HEV), and a plug-in hybrid electric vehicle (PHEV); an electric two-wheeled vehicle comprising E-bike and E-scooter; an electric golf cart; an electric truck; an electric commercial vehicle; and a power storage system.

14. The battery module according to claim 1, wherein the one or more through holes of the electrode assembly are formed on the same position so that a through hole of the electrode assembly corresponds to a through hole of the pouch exterior member.

15. The battery module according to claim 1, wherein a through hole of the electrode assembly and a through hole of the pouch exterior member are formed in the same shape.

16. The battery module according to claim 1, wherein the one of the one or more through holes of the electrode assembly that is larger than the size of the corresponding one of the one or more through holes of the pouch exterior member is larger by the width of the supplementary sealing portion.

17. The battery module according to claim 1, further comprising:
a second pouch type secondary battery comprising:
an electrode assembly, a pouch exterior member, and a passing sealing portion,
wherein the electrode assembly comprises a cathode, an anode, and a separator,
wherein the electrode assembly comprises one or more through holes,
wherein the pouch exterior member comprises one or more through holes formed within a substantially planar section of a sheet of the pouch exterior member that correspond with the one or more through holes of the electrode assembly such that the one or more through holes of the pouch exterior member are outside a periphery of the electrode assembly,
wherein the battery module is formed by connecting a unit battery fixing bar through the one or more through holes of the electrode assembly and the one or more through holes of the pouch exterior member,
wherein a size of one of the one or more through holes of the electrode assembly is larger than a size of a corresponding one of the one or more through holes of the pouch exterior member; and
a housing in which both of the pouch type secondary batteries are located, the housing including a plurality of grooves on an inside surface thereof corresponding with both of the pouch type secondary batteries.

18. The battery module according to claim 1, wherein the unit battery fixing bar is monolithic.

19. A battery module comprising:
a pouch type secondary battery comprising an electrode assembly, a pouch exterior member, and a passing sealing portion,
wherein the electrode assembly comprises a cathode, an anode, and a separator,
wherein the electrode assembly comprises one or more through holes,
wherein the pouch exterior member comprises an upper sheet and a lower sheet, one or more through holes formed within a substantially planar section of the upper sheet that correspond with the one or more through holes of the electrode assembly, one or more through holes formed within a substantially planar section of the lower sheet that correspond with the one or more through holes of the electrode assembly, such that all of the through holes of the pouch exterior member are outside a thickness-directional periphery of the electrode assembly,
wherein the battery module is formed by connecting a unit battery fixing bar through the one or more through holes of the electrode assembly and the one or more through holes of the pouch exterior member,
wherein a size of one of the one or more through holes of the electrode assembly is larger than a size of a corresponding one of the one or more through holes of the pouch exterior member,
wherein a supplementary sealing portion is formed along an inner circumferential surface of the one of the one or more through holes of the electrode assembly to prevent inner short of the secondary battery, and
wherein the supplementary sealing portion is configured to bend in any direction to accommodate installation of the unit battery fixing bar.

* * * * *